(12) United States Patent
Tsantzalis et al.

(10) Patent No.: US 10,525,904 B2
(45) Date of Patent: Jan. 7, 2020

(54) THERMAL VISION IMAGING DEVICE AND SYSTEM

(71) Applicants: Stavros Tsantzalis, Agios Dimitrios (GR); Petros Karapappas, Galatsi (GR)

(72) Inventors: Stavros Tsantzalis, Agios Dimitrios (GR); Petros Karapappas, Galatsi (GR)

( * ) Notice: Subject to any disclaimer, the term of this patent is extended or adjusted under 35 U.S.C. 154(b) by 0 days.

(21) Appl. No.: 16/048,229

(22) Filed: Jul. 28, 2018

(65) Prior Publication Data

US 2019/0077334 A1 Mar. 14, 2019

(30) Foreign Application Priority Data

Jun. 26, 2017 (GR) .............................. 20170100295

(51) Int. Cl.
| | |
|---|---|
| *H04N 7/18* | (2006.01) |
| *B60R 11/04* | (2006.01) |
| *H04N 5/33* | (2006.01) |
| *H04W 4/80* | (2018.01) |
| *H04N 5/225* | (2006.01) |

(52) U.S. Cl.
CPC ........... *B60R 11/04* (2013.01); *H04N 5/2257* (2013.01); *H04N 5/33* (2013.01); *H04W 4/80* (2018.02); *B60R 2300/103* (2013.01); *B60R 2300/106* (2013.01); *H04N 5/2252* (2013.01)

(58) Field of Classification Search
CPC .... B60R 11/04; H04N 5/2252; H04N 5/2257; H04N 5/33; H04W 4/80
USPC ........ 348/148, 143, 149, 151; 386/210, 224, 386/226
See application file for complete search history.

(56) References Cited

U.S. PATENT DOCUMENTS

2013/0060500 A1   3/2013 Narumi
2018/0341289 A1*  11/2018 Schachter ............... B60R 11/02

FOREIGN PATENT DOCUMENTS

| CN | 102507013 A | 6/2012 |
|---|---|---|
| CN | 205545587 U | 8/2016 |
| WO | WO2014159758 A1 | 10/2014 |
| WO | WO2016062708 | 8/2016 |

* cited by examiner

*Primary Examiner* — Robert Chevalier
(74) *Attorney, Agent, or Firm* — GE Capitol City Associates

(57) ABSTRACT

A constant electrical power supply independent device with an integrated system capable of wirelessly transmitting infrared images and can be temporarily installed/mounted on various platforms including air, seal, and land vehicles.

19 Claims, 2 Drawing Sheets

THERMAL VISION IMAGING DEVICE AND SYSTEM

CROSS REFERENCE TO RELATED APPLICATIONS

The present application claims priority from application 20170100295 filed on Jun. 26, 2017 with the Greek Patent Office which is incorporated herein by reference in its entirety.

BACKGROUND

The present invention relates generally to a thermal vision imaging device and system. More particularly, the present invention relates to an autonomous non-permanent installation thermal vision infrared imaging device and system. The device can transmit a thermal vision image wirelessly in real time to an electronic device such as a smartphone, tablet, laptop, PC using Wi-Fi and/or Bluetooth communication protocols.

Transporting people and goods safely during night and at low visibility conditions (fog, smog, low cloud, heavy rain, etc.) is a chronic problem that has not been solved in an efficient manner until now. Moreover, the increase of air traffic and air transport due to affordable fares has intensified the problem. Statistically speaking in Australia 65% of the accidents between a car and a motorbike are due to low visibility while in Europe this is 30% of the total accidents. The main proposed and implemented solution to the problem is to increase the brightness/luminosity of the light source. This could be done either on the vehicle e.g. a car or, on the transport network e.g. motorway lights. By increasing the light brightness the human eye has the ability to further detect the danger so as to react quicker.

The aforementioned solution even though is widely used has shortcomings because it cannot be used everywhere e.g. weight restrictions on air vehicles, installation and maintenance costs, operational costs, limited capability under fog, smog, dust, etc. even if the latest technology LEDs are used that increase visibility by 400 m in average. With the recent and forecast increase in air traffic and air travel it is anticipated that incidents and accidents may also increase. According to FAA (Federal Aviation Authority) in 2016 around 1500 incidents/accidents occurred due to low visibility conditions, while in Europe the number of incidents was around 5000 between 2005 and 2011. The main reasons for the aforementioned incidents besides poor visibility conditions were also technical issues that put the light systems of an airport or an airstrip out of order. Unserviceable light systems present more severe problems for remote airport/airstrip where the risk of collision with animals is rather high. When such collisions occur loses may not only include damaged vehicles and goods but also human lives.

Maritime accidents usually don't include the loss of human lives but the cost of the damages is rather high. It has to be noted that maritime accidents do happen even with vessels that have state of the art electronic equipment including passive and active radars. Moreover, the cost of installing, maintaining and operating such systems is quite substantial therefore small and/or medium size vessels are not equipped with. Finally, when it comes to personal usage, the low autonomy and the high weight of a high luminosity system make it difficult to use, while the use of GPS even though it is widely used it requires a connection with a minimum number of active satellites.

One of the proposed solutions for manned air vehicles is the use of night vision goggles that enhance/amplify the existing light of the moon and/or the stars. The shortcoming of the night vision goggles besides that they need a minimum intensity light source to operate is that the cockpit panel has to be modified accordingly.

Moreover, the horizontal vision is severely impeded with the maximum being 20° and also the 3D perception of depth is distorted making thus difficult to estimate the distance of objects, terrain, vehicles and humans.

An alternative solution to the problem is to use thermal vision infrared (IR) cameras. The IR cameras are capable of displaying the temperature difference of objects with temperature above −273° C. either in grayscale or in colour. The IR systems have been widely and have a lot of operational advantages however they usually require dedicated display monitors, specialised complex permanent installation and maintenance making them cost ineffective for wide spread use.

The following web publications relate generally to the above described background of the invention.

https://www.faa.gov/airports/runway safety/statistics/regional/?fy=2016.

http://www.who.int/violence_injury_prevention/publications/road_traffic/world_report/visibility_en.pdf http://www.volvotrucks.com/SiteCollectionDocuments/VTC/Corporate/Values/ART%20Report%202013_150dpi.pdf https://books.google.gr/books?id=CuTGXLBSEZYC&pg=PA323&dq=low+visibility+car+accident+europe&hl=en&sa=X&ved=0ahUKEwinseW5zcnUAhVHVBQKHdTPAScQ6AEIJjAA

SUMMARY OF THE INVENTION

The present invention relates generally to an infrared thermal vision device (device) and system.

The device and system combine the advantages of an infrared thermal vision camera with the simplicity and affordability of every day electronic devices like a smartphone, a tablet, a laptop, a desk-top computer and/or the like.

The present invention device may be readily and removably secured to a desired location of a vehicle.

The present invention device may be readily switched to a hand-held use device or a vehicle installed device.

The present invention device requires less power for operation.

The present invention device employs commonly available wireless communications for transmitting the images to an electronic device such as a desk-top computer, a lap-top, a smart phone and/or the like where the images can be displayed employing a corresponding application. The term image is used herein broadly to mean both images and video.

The present invention employs standard Wi-Fi communication protocols to transmit infrared images in real-time using an electronic device as the display unit minimising thus complexity and cost.

The present invention does not require a permanent installation.

The present invention is autonomous, i.e., does not require an external power supply.

The present invention device employs an integrated rechargeable power pack that uses a standard electrical wire and adaptor for recharging.

According to an embodiment of the present invention a device is provided which includes a thermal vision infrared camera that can record real time images (images and/or video) without the need to use a dedicated screen for imaging since it uses an integrated circuit for transmitting the images to an electronic device equipped with a suitable display. The device can transmit the image wirelessly in real time to an electronic device such as a smartphone, tablet, laptop, PC using Wi-Fi and/or Bluetooth communication protocols.

The device does not require an external power supply since a rechargeable power pack is integrated using a standard wire and power plug for recharging as required.

The device does not require a permanent installation. It can be mounted retrievably to a vehicle. The device can be used on any type of vehicle including air, sea and land vehicles.

In an embodiment the device may be implemented as a hand-held device.

These and other features and advantages of the present invention will become apparent to those skilled in the art to which the present invention pertains from the following detailed description of specific embodiments of the invention in reference with the following figures.

DETAILED DESCRIPTION OF THE INVENTION

Figure 1:
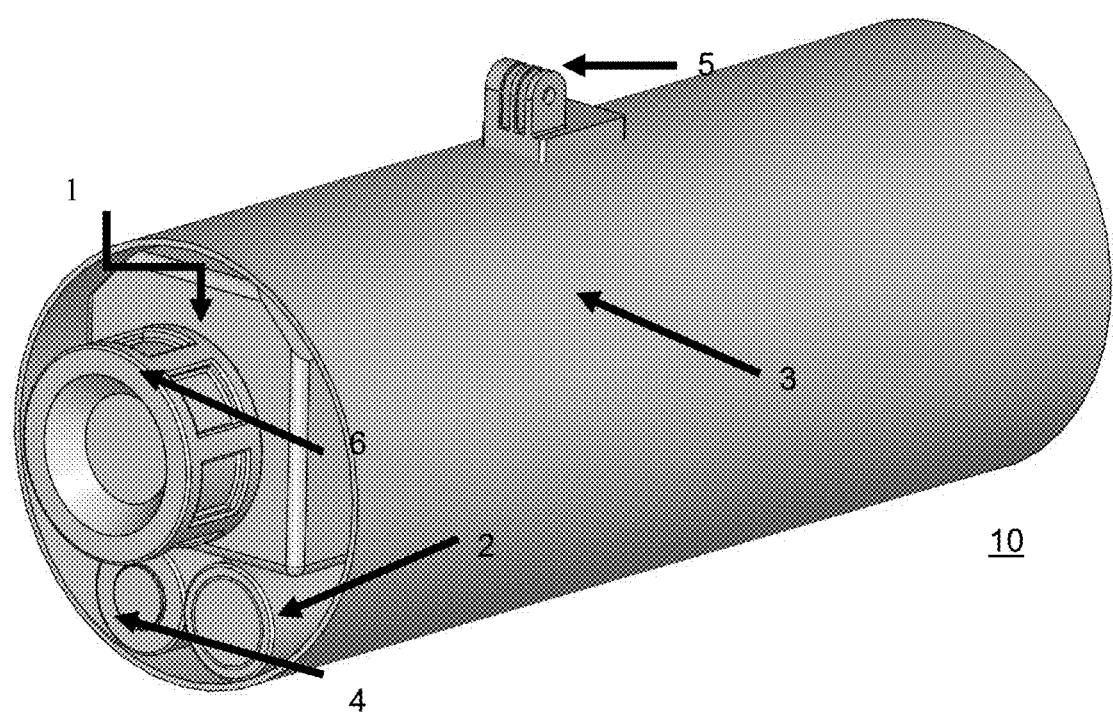
FIG. 1 is a perspective view of a device showing the main components of an autonomous, non-permanent installation thermal vision infrared camera that transmits an image wirelessly in real time, according to an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the various aspects and features of the present invention to those skilled in the art to which this invention pertains. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

It is also noted, that in some instances, as would be apparent to those skilled in the relevant art, a feature or element described in connection with one embodiment may be used singly or in combination with other features or elements of another embodiment, unless otherwise specifically indicated.

The described invention concerns a device with an integrated infrared thermal vision camera that can be used from any moving object such as any sea, air and land vehicle and may transmit captured images (images and video) to an electronic device where it can be displayed. The captured images may be transmitted in real time. The captured images may be transmitted using a Wi-Fi communication protocol. The device does require neither a permanent installation nor a permanent power supply. The device can be mounted on a moving object such as a vehicle or a maritime vessel using a mount. The mount may be a standard action camera mount.

An integral part of the invention is the use of Wi-Fi communication protocols to transmit the infrared image in real-time.

Another integral part of the invention is the use of an integrated rechargeable power pack that uses standard voltage wires.

Yet another integral part of the invention is the Wi-Fi transmitter circuit that transmits the infrared image in real-time.

Yet another integral part of the invention is the use of non-permanent installation mounts/fixings.

The casing may be made of a suitable material for protecting the electronic parts of the device. The casing may be made of a sturdy and light material. The casing may be made of a material that is insulating. In an embodiment the casing may be made of aluminium or fibre reinforced polymer (FRP).

The size of the device, the materials used and the fact that it does not include a display allows keeping the overall weight below 300 grams.

Important advantages of the invention include: a non-permanent power supply is required for the device to operate; non dedicated images displays/screens are required resulting in increased flexibility and reduced costs; standard smart devices including mobile phones, tablets, etc. can be used to display the infrared image in real-time; non-permanent installation is required and temporary action camera mounts can be used instead, the weight of the device (less than 300 grm) and its power consumption do not require a certification from the civil aviation authorities when to be used on aircrafts or helicopters contributing thus to reduced cost.

Hereinafter, the various embodiments of the present invention will be described in detail with reference to the attached drawings.

Referring to FIG. 1, a device is provided according to an embodiment of the present invention. The device is generally indicated with numeral 10.

The device 10 incorporates an infrared thermal vision camera 1 and can be used on any sea, air or land vehicle or by individuals during night time or low visibility conditions due to fog, smog, rain, etc. As illustrated in FIG. 1, the device 10 comprises an infrared thermal vision camera 1 having a lens 6, a Wi-Fi transmitter circuit 2, a casing 3, a power pack 4, and a mount 5.

The casing 3 as illustrated may have a generally cylindrical shape and may house the camera 1, the power pack 4, and Wi-Fi transmitter circuit 2. The casing 3 may be made of a light and sturdy material. In an embodiment, the casing 3 is made of aluminium or fibre reinforced polymer (FRP). The fibres could be carbon, glass or aramid. The casing 3 may have two lids, i.e., a front lid 7 and a back lid (not shown) that can close hermetically to make the whole device waterproof. At least one of the lids can be opened and closed thus providing easy access to the device's components for servicing and replacement as may be needed.

The mount 5 may be readily and securely locked into a desired position with a matching vehicle mount for removably attaching the device 10 to a vehicle. The mount 5 may be securely locked into a desired position with a matching vehicle mount via hand tightening. The mount 5 may be securely attached to the casing 3. The mount 5 may include a base part having a substantially curved shape matching the surface of the casing 3 with which it comes into contact to allow for optimum fit of the mount 5 on the casing 3. The mount 5 may be secured to the casing via any suitable means. Alternatively, the mount 5 may be formed as an integral part of the casing 3. Mount 5 may also have a connector part vertically protruding above the base part and having at least one vertical cavity formed therein for receiving a matching protruding part of a vehicle connector (not shown) installed on a vehicle (not shown). The connector part of the mount 5 which is shown in FIG. 1 has two cavities formed between three vertically protruding parts. The connector part of the mount 5 may have an overall "W" shape where the legs of the "W" are vertical. The connector part also has a horizontal aperture penetrating through the connector part. A pin (not shown) may be inserted through the aperture after the mount 5 is coupled to a matching connector of a vehicle mount so that the protruding vertical parts of the vehicle mount connector are inserted into the cavity or cavities of the connector part of the mount 5 of the device 1 for securing the device 10 to the vehicle. The pin may have a first end that is threaded, an elongated intermediate part having a diameter that is slightly smaller than the diameter of the aperture of the connector part of the mount 5, and a second end (head) that has a larger cross-section than the intermediate part. The pin may be inserted through the aperture and securely attached to the mount 5 with a threaded winged nut via hand tightening of the winged nut to the threaded end of the pin. By hand tightening the winged nut the device 10 can be secure attached to the vehicle mount. In another embodiment, the aperture through the connector parts of the mount 5 and of the vehicle mount may be threaded in which case the pin may be a threaded winged screw (or butterfly screw) that can be hand tightened to secure the device 10 to the vehicle.

The mount 5 may be made of the same material as the casing 3. The connector part of the mount 5 may have sufficient flexibility in the horizontal direction to allow squeezing tightly the protruding connector parts of the mount 5 with the protruding parts of the connector of the vehicle mount upon tightening of the pin. This way the positioning angle of the device 10 can be selected and maintained. It is noted that in another embodiment, not shown, the mount 5 may include intermediate connector means coupling the base part with the connector part of the mount 5 for allowing horizontal rotation of the connector part relative to the base part. In yet another embodiment (not shown), the base part of the mount 5 may be rotatably mounted to the casing 3. For example, the base part may be a disc positioned within a corresponding matching circular cavity of the casing 3.

The power pack 4 may be any suitable secondary battery that is light enough and provides sufficient power to operate the device for an adequate amount of time. In an embodiment, the secondary battery is a lithium ion battery.

Figure 2:
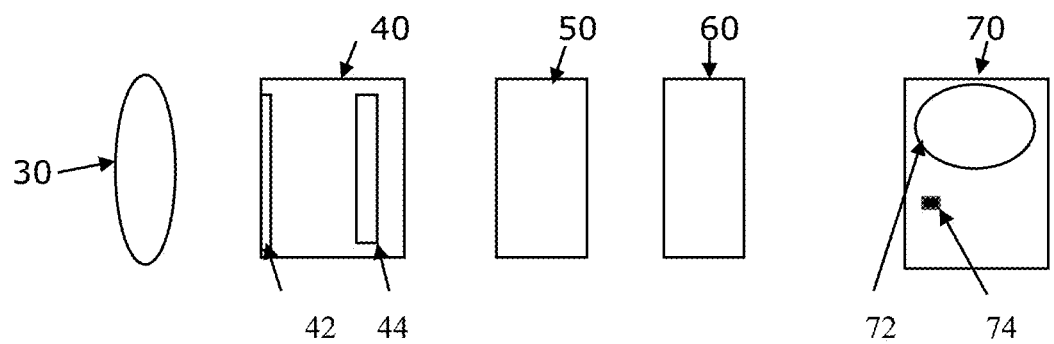
FIG. 2 is a simplified schematic diagram of a device and system, according to an embodiment of the present invention.

The infrared thermal vision camera 1 may be any suitable camera. According to an embodiment of the present invention which is illustrated in FIG. 2, the device 1 may include an infrared thermal vision camera including a lens 6 allowing infrared radiation to enter and direct it to a detector 40. The incoming infrared radiation may heat a sensor 42 of the detector 40 which in turn may change a parameter such as the resistance of the sensor 42. The sensor 42 may be an uncooled thermal sensor such as a microbolometer sensor. The detector 40 may further include means for measuring the change of the parameter of the sensor 42 of the detector 40 (e.g., the resistance of the sensor 42) caused by the change in the temperature by the received infrared red radiation. The changed parameter data (e.g., the resistance data) may then be fed to a processor 50 for converting the resistance data into temperature data and then in image data. The processor 50 may be a microprocessor. The image data may then be transferred via the Wi-Fi transmitter circuit 60 to an electronic device 70 wherein the data are displayed in the display 72 of the smart device through the use of an application 74 installed in the electronic device 70. Electronic device 70 may be, for example, a smart phone. The Wi-Fi transmitter circuit 60 of FIG. 2 may be the same as the Wi-Fi transmitter circuit 2 of FIG. 1. It is further noted that the detector 40, the processor 50, and the Wi-Fi transmitter circuit 60 are shown as separate in the embodiment of FIG. 2, however, the present invention is not limited in this way.

Operation Description

According to an embodiment, the device can be mounted on a vehicle on a location that is in the line of sight with the vehicle's direction. The term vehicle is used broadly herein to mean any moving platform including but not limited to land vehicles, and maritime vessels. The device can be mounted on a vehicle in a retrievable manner using a suitable mount. The mount may be mount 5 illustrated in FIG. 1.

The device can then be turned on using a switch (not shown) which is part of the device. By switching on the device, both the power pack 4 and the Wi-Fi transmitter circuit 2 are activated. The user then has to turn on his/her smart device or laptop/computer, activate the Wi-Fi, connect to the device's Wi-Fi and open the installed corresponding software application. As soon as the two-way communication between the smart device and the camera is established the user will be able to see on his smart device screen the infrared images taken by the camera in real-time.

Although the invention has been described with specific embodiments it should be understood that many other embodiments may be envisaged by those skilled in the art to which the present invention pertains without departing from the scope or spirit of the present invention as defined by the following claims.

What is claimed is:

1. A device comprising an infrared thermal vision camera for generating image data, means for wirelessly transmitting the image data to an external electronic device having a display for displaying an infrared image based on the image data, a cylindrical casing housing said infrared thermal vision camera and the means for wirelessly transmitting the image data, and a mounting mechanism for removably mounting the device to a vehicle,
   wherein the mounting mechanism includes a mount that is an integral part of the casing of the device.

2. The device according to claim 1, wherein said means comprise an integrated wireless transmission circuit for wirelessly transmitting the image data in real time using a wireless communication protocol including Wi-Fi and/or Bluetooth via the integrated wireless transmission circuit.

3. The device according to claim 1, wherein the external electronic device is at least one of a smart phone, tablet, laptop and desktop PC equipped with suitable software for the real time display of image and video based on the received image data from the integrated wireless transmission circuit.

4. The device according to claim 1, further comprising an integrated electrical rechargeable power pack that uses stand wires and is used to power the device.

5. The device according to claim 1, wherein the mount has a base securely attached to the casing of the device, a connector part vertically protruding from the base and forming at least one cavity suitable for receiving a matching protruding part of a vehicle connector, and a horizontal mount aperture penetrating through the connector part for receiving a pin that locks the mount to the vehicle connector.

6. The device according to claim 3, wherein the external electronic device includes a software application written in a suitable software code used for connecting the external electronic device with the device, for receiving the image data and for displaying the image on the display of the electronic device in real time.

7. An infrared imaging system comprising:
a first electronic device comprising an infrared thermal image device suitable for generating infrared image/video data, an integrated wireless transmission circuit suitable for transmitting the image/video data wirelessly using a wireless communication protocol to a second electronic device, a cylindrical casing housing said infrared thermal vision device and the integrated wireless transmission circuit, and a mounting mechanism for removably mounting the device to a vehicle; and the second electronic device,
wherein the mounting mechanism includes a mount that is an integral part of the casing of the device.

8. The imaging system according to claim 7, wherein the transmitting the image/video data wirelessly using a wireless communication protocol includes Wi-Fi and/or Bluetooth to an electronic device.

9. The imaging system according to claim 7, wherein the second electronic device is equipped with a display and a software application suitable for the real time conversion of the image/video data received from the wireless transmission circuit into image/video displayed in the display.

10. The imaging system according to claim 7, wherein the second electronic device is selected from the group consisting of at least one of a smart phone, tablet, laptop and desktop PC.

11. The imaging system according to claim 7, wherein the first electronic device comprises a casing housing the infrared device and the integrated wireless transmission circuit.

12. The imaging system according to claim 11, wherein the casing is made of aluminium, or a fibre reinforced polymer.

13. The imaging system according to claim 12, wherein the fibre reinforced polymer is reinforced with carbon, glass or aramid fibers.

14. The imaging system according to claim 11, wherein the casing has a cylindrical shape having front and back openings and wherein a front and a back lid close hermetically the front and back openings respectively to render the imaging system waterproof and also provide easy access to the first electronic device's components for servicing and replacement if necessary.

15. The imaging system according to claim 14, wherein the first electronic device is mounted to the vehicle via the mounting mechanism.

16. The imaging system according to claim 15, wherein the mount has a base securely attached to a casing of the device, a connector part vertically protruding from the base and forming at least one cavity suitable for receiving a matching protruding part of a vehicle connector, and a horizontal mount aperture penetrating through the connector part for receiving a pin that locks the mount to the vehicle connector.

17. The imaging system of claim 16, wherein the first electronic device operates autonomously using a power pack, and wherein the first electronic device weighs less than about 300 grams.

18. The imaging system of claim 7, wherein the first electronic device is operated as a hand-held device and can also be mounted retrievably to a vehicle via a mounting mechanism.

19. The imaging system of claim 11, wherein the casing material is made of glass reinforced plastic, or carbon fibre reinforced plastic.

* * * * *